United States Patent
Adams et al.

(10) Patent No.: US 11,106,825 B1
(45) Date of Patent: Aug. 31, 2021

(54) PREDETERMINED CREDENTIAL SYSTEM FOR REMOTE ADMINISTRATIVE OPERATING SYSTEM (OS) AUTHORIZATION AND POLICY CONTROL

(71) Applicant: Netskope, Inc., Santa Clara, CA (US)

(72) Inventors: Matthew D. Adams, Ajax (CA); Daniel F. Taylor, Collierville, TN (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 17/094,550

(22) Filed: Nov. 10, 2020

(51) Int. Cl.
| | |
|---|---|
| *G06F 21/62* | (2013.01) |
| *G06F 21/60* | (2013.01) |
| *G06F 21/12* | (2013.01) |
| *H04L 9/32* | (2006.01) |

(52) U.S. Cl.
CPC ........ *G06F 21/6281* (2013.01); *G06F 21/126* (2013.01); *G06F 21/602* (2013.01); *G06F 21/121* (2013.01); *H04L 9/32* (2013.01)

(58) Field of Classification Search
CPC .. G06F 21/6281; G06F 21/126; G06F 21/602; G06F 21/62; G06F 21/60; G06F 21/12; G06F 21/121; H04L 9/32
See application file for complete search history.

(56) References Cited

U.S. PATENT DOCUMENTS

| | | | |
|---|---|---|---|
| 6,266,811 B1 | 7/2001 | Nabahi | |
| 6,282,711 B1 | 8/2001 | Halpern | |
| 6,725,453 B1 | 4/2004 | Lucas | |
| 7,870,153 B2 | 1/2011 | Croft | |
| 7,949,677 B2 | 5/2011 | Croft | |
| 8,151,323 B2 | 4/2012 | Harris | |
| 8,438,635 B2 | 5/2013 | Das | |
| 8,543,665 B2 | 9/2013 | Ansari | |
| 8,839,234 B1* | 9/2014 | Voronkov | G06F 21/31 717/176 |
| 9,270,765 B2 | 2/2016 | Narayanaswamy et al. | |
| 9,313,196 B2 | 4/2016 | Pritchard, Jr. | |
| 9,575,739 B2 | 2/2017 | Bhattiprolu | |
| 9,600,257 B2 | 3/2017 | Somani et al. | |
| 9,928,377 B2 | 3/2018 | Narayanaswamy | |
| 10,187,426 B2 | 1/2019 | Ylonen | |
| 10,404,755 B2 | 9/2019 | Narayanaswamy et al. | |
| 2008/0034200 A1* | 2/2008 | Polcha | H04L 41/0806 713/153 |
| 2010/0100610 A1 | 4/2010 | Bezanson | |
| 2011/0061046 A1 | 3/2011 | Phillips | |
| 2011/0083163 A1* | 4/2011 | Auvenshine | H04L 63/0884 726/4 |
| 2012/0102484 A1 | 4/2012 | Hopmann | |

(Continued)

*Primary Examiner* — Jayesh M Jhaveri
(74) *Attorney, Agent, or Firm* — Kilpatrick Townsend & Stockton LLP (57) ABSTRACT

A predetermined credential system for remote administrative operating system (OS) authorization and policy control is disclosed. Administrative activities are packaged in single-use downloaded software. When executed, the administrative access to the OS is activated before completing the administrative activities. The single-use downloaded software has policies that reacts to the condition of the user computer. The single-use downloaded software can be protected with a credential to prevent activation in an unauthorized way.

20 Claims, 5 Drawing Sheets

(56) References Cited

U.S. PATENT DOCUMENTS

| | | | |
|---|---|---|---|
| 2013/0232239 A1* | 9/2013 | Akiyama | H04L 41/0803 709/220 |
| 2015/0026675 A1* | 1/2015 | Csaszar | G06F 21/12 717/178 |
| 2016/0285852 A1* | 9/2016 | Seliger | H04L 67/146 |
| 2018/0167491 A1* | 6/2018 | Roszak | G06F 21/10 |
| 2020/0310868 A1* | 10/2020 | Tatarinov | G06F 21/6281 |

\* cited by examiner

PREDETERMINED CREDENTIAL SYSTEM FOR REMOTE ADMINISTRATIVE OPERATING SYSTEM (OS) AUTHORIZATION AND POLICY CONTROL

BACKGROUND

This disclosure relates in general to operating system security and, but not by way of limitation, to policy-controlled authorization among other things.

Personal computer (PC) security is weak. Many enterprises have limited control over PCs, smartphones and other computerized devices and systems. This is especially true as employees work from home or otherwise outside the local area network (LAN) on premises. Additionally, many enterprises have bring your own device (BYOD) policies that lead to many different hardware configurations with personal applications and activity. This new business topology is a security nightmare.

Operating systems (OSes) seek to control certain activity with an administrative control scheme. An administrative credential is required for certain functions, such as installing some software. Information technology (IT) staff typically control the administrative credential so that they can regulate activity requiring administrative control. For example, changing system settings, installing software, installing printers, etc. can all be limited to administrative authorized activity. Some OSes allow customizations of the activity that require administrative access. When working off-site, the IT staff often must remote into the user computer to perform restricted activity.

SUMMARY

In one embodiment, the present disclosure provides a predetermined credential system for remote administrative operating system (OS) authorization and policy control. Administrative activities are packaged in single-use downloaded software. When executed, the administrative access to the OS is activated before completing the administrative activities. The single-use downloaded software has policies that reacts to the condition of the user computer. The single-use downloaded software can be protected with a credential to prevent activation in an unauthorized way.

In another embodiment, an authenticated software distribution system for remote administrative OS authorization and policy control is disclosed. The authenticated software distribution system comprising a target instance that performs various operations on a program. The program is received that doesn't require administrative rights by the OS to run on the PC. The program runs on the PC. The program encapsulates an administrative credential. A login screen or application program interface (API) accepts the credential. An administrative credential is decrypted. An administratively-controlled activity on the PC is automatically initiated. The administrative credential is automatically entered into the OS. The administratively-controlled activity is performed.

In yet another embodiment, a method for remote administrative operating system (OS) authorization and policy control on a personal computer (PC) is disclosed. A program that doesn't require administrative rights by the OS to run on the PC is received before being run. The program encapsulates an administrative credential. The credential is accepted with a login screen or application program interface (API). An administrative credential is decrypted. An administratively-controlled activity is automatically initiated on the PC. The administrative credential is automatically into the OS. The administratively-controlled activity is performed.

In still another embodiment, an authenticated software distribution system for remote administrative OS authorization and policy control is disclosed. The authenticated software distribution system comprising one or more processors and one or more memories with code for running a target instance. The target instance performs a number of steps including that it: receives a program that doesn't require administrative rights by the OS to run on the PC; runs the program on the PC, wherein the program encapsulates an administrative credential; accept the credential with a login screen or application program interface (API); decrypts an administrative credential; automatically initiates an administratively-controlled activity on the PC; automatically enters the administrative credential into the OS; and performs the administratively-controlled activity.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
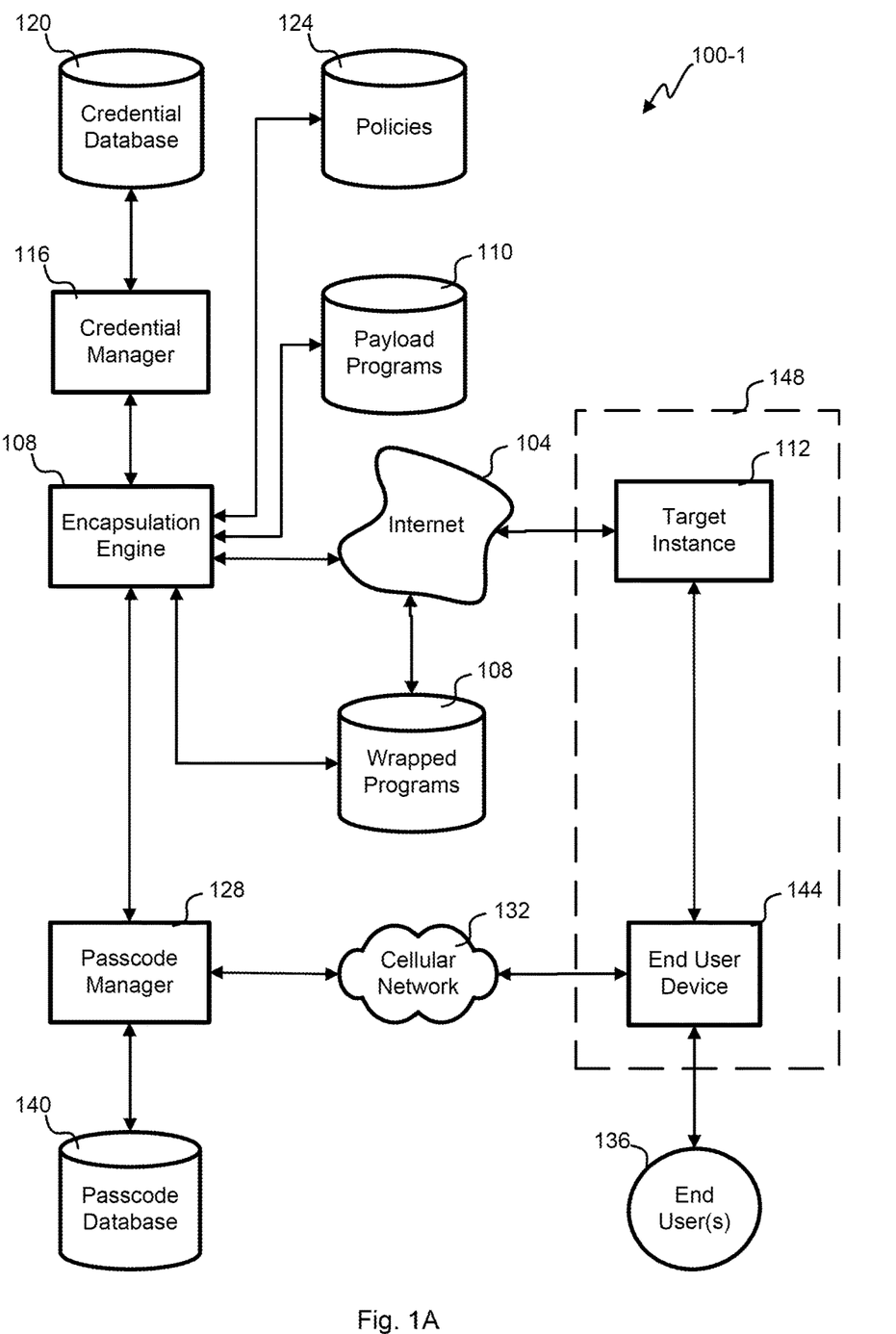
FIGS. 1A, 1B and 1C depict block diagrams of embodiments of an authenticated software distribution system.

Referring first to FIG. 1A, a block diagram of an embodiment of an authenticated software distribution system 100-1 is shown. Information technology (IT) personnel interact with an encapsulation engine 108 to distribute software executables and policies to end user computers 148 (e.g., end user devices 144, target instances 112). For example, an end user 136 may work remotely on their target instance 112 (e.g., iOS™, Windows™, Linux, MacOS™ UNIX, Chromebook™, Android™) either on local hardware or a container hosted in a cloud provider. IT may want to install software or change a setting that would typically require remoting into the end user computer or sharing the administrator credential. Instead, encapsulation engine 108 is configured to send a wrapped program that can install and enter the administrator credential to effectuate the change without wasting time in this embodiment.

Each end user computer 148 is typically locked down with an administrator credential to limit certain actions to performance by IT staff who know the credential. In some embodiments, a credential manager 116 is used to manage a credential database 120 storing all the administrator credentials for an enterprise or domain. Each end user computer 148 could have a different administrator credential or one that is shared among groups of end user computers 148. In this embodiment, the credential manager 116 has a different admin credential for each end user computer 148 and can optionally include a policy with the wrapped program 108 that would change the admin credential periodically or with each wrapped program 108 that is sent. The credential manager 116 updates the credential database 120 with any update to an admin credential for the end user computers 148.

The IT staff often wants to distribute a program or change a setting to the end user computer 148 that would require entry by the end user of the admin credential. The present invention, automatically enters the admin credential when required without requiring end user 136 assistance or other human intervention. A payload program 110 to add functionality and/or a payload program 110 that would affect policy(ies) 124 and/or change update settings and configuration is selected for an end user computer 148 or a group of end user computers 148. For example, IT staff may want to enable installation of a printer driver and a script to perform that action could be encapsulated into a wrapped program 108 along with the admin credential for the target end user computer 148. Where the admin credential is unique to the target end user computer 148, no other computer could use it to install the script. The admin credential is encrypted in the wrapped program 108.

This embodiment includes an additional layer of security by encrypting or locking the wrapped program 108 with a passcode. For example, the wrapped program could be encrypted into a ZIP™ file where the passcode is needed to use it. Other embodiments could condition install of the wrapped program 108 upon successfully providing the passcode when prompted. The passcode could be predetermined and known by the end user such as a PIN or network password. In this embodiment, the passcode is unique to each wrapped program 108 and stored in the passcode database.

When a wrapped program 108 is made available to the end user 136, a message could be sent to the end user computer 148 with a link to download the wrapped program. The passcode manager 128 sends the passcode through another communication channel to allow two-factor authentication. For example, the passcode manager 128 could send the passcode through a cellular network 132 to an end user device 144 (e.g., phone, tablet, computer, smart watch, or other networked device). The embodiments of FIGS. 1B and 1C do not include two-factor authentication.

The end user 136 would have to authenticate into the end user device 144 so it is unlocked to see the passcode, which is entered when prompted to allow use of the wrapped program. Some embodiments also send the download link or filename for the wrapped program 108 to confirm it is not a phishing attempt. For example, a message such as "We just sent a passcode for the Printer_2EA46B.exe program. Please confirm that file name prior to execution." If the file name is unique, this prevents execution of malicious software in one embodiment.

Figure 1B:
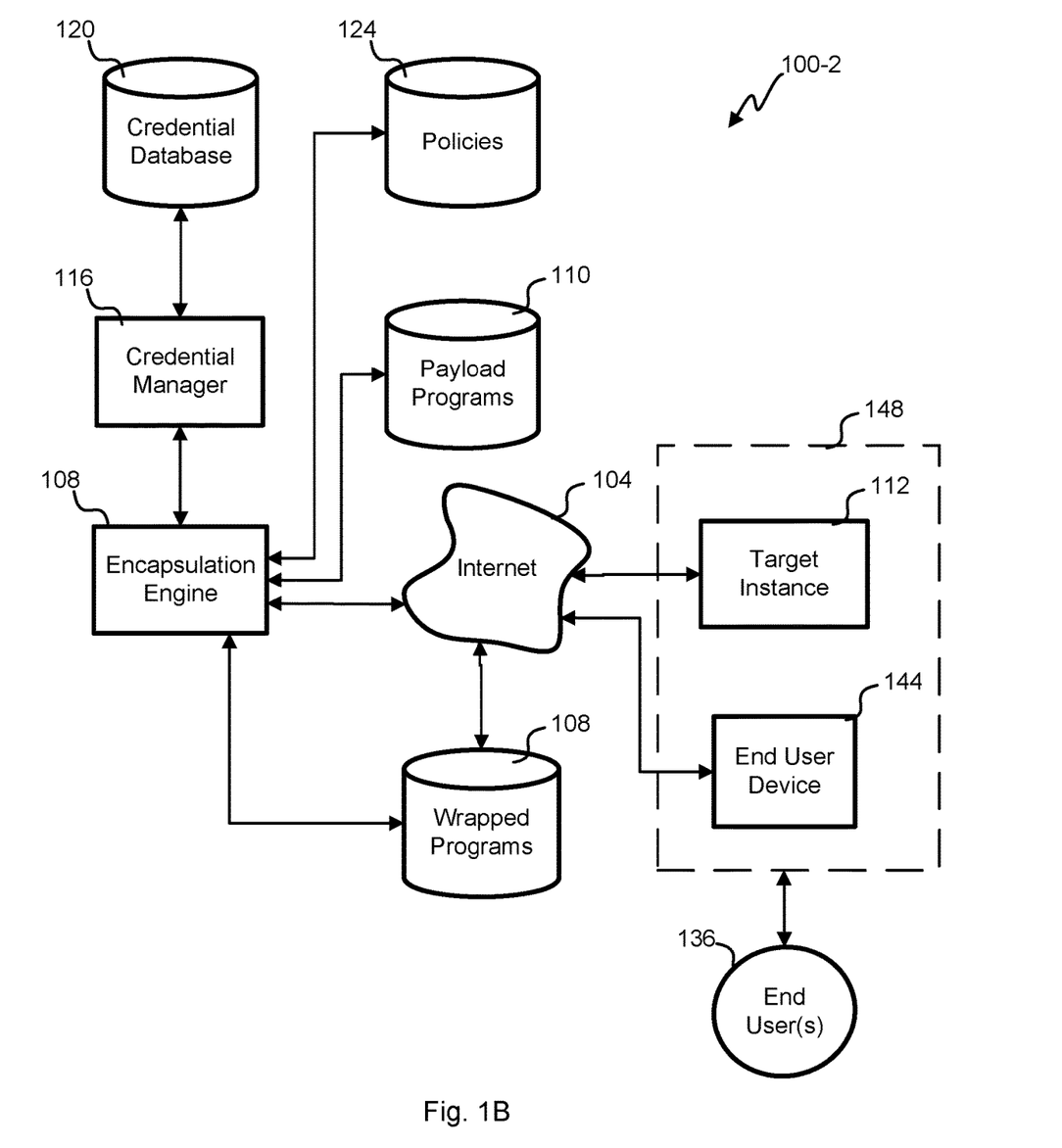

With reference to FIG. 1B, a block diagram of another embodiment of the authenticated software distribution system 100-2 is shown. Unlike the embodiment of FIG. 1A, this embodiment doesn't have passcode authentication of the wrapped programs. Two factor authentication is optional.

Figure 1C:
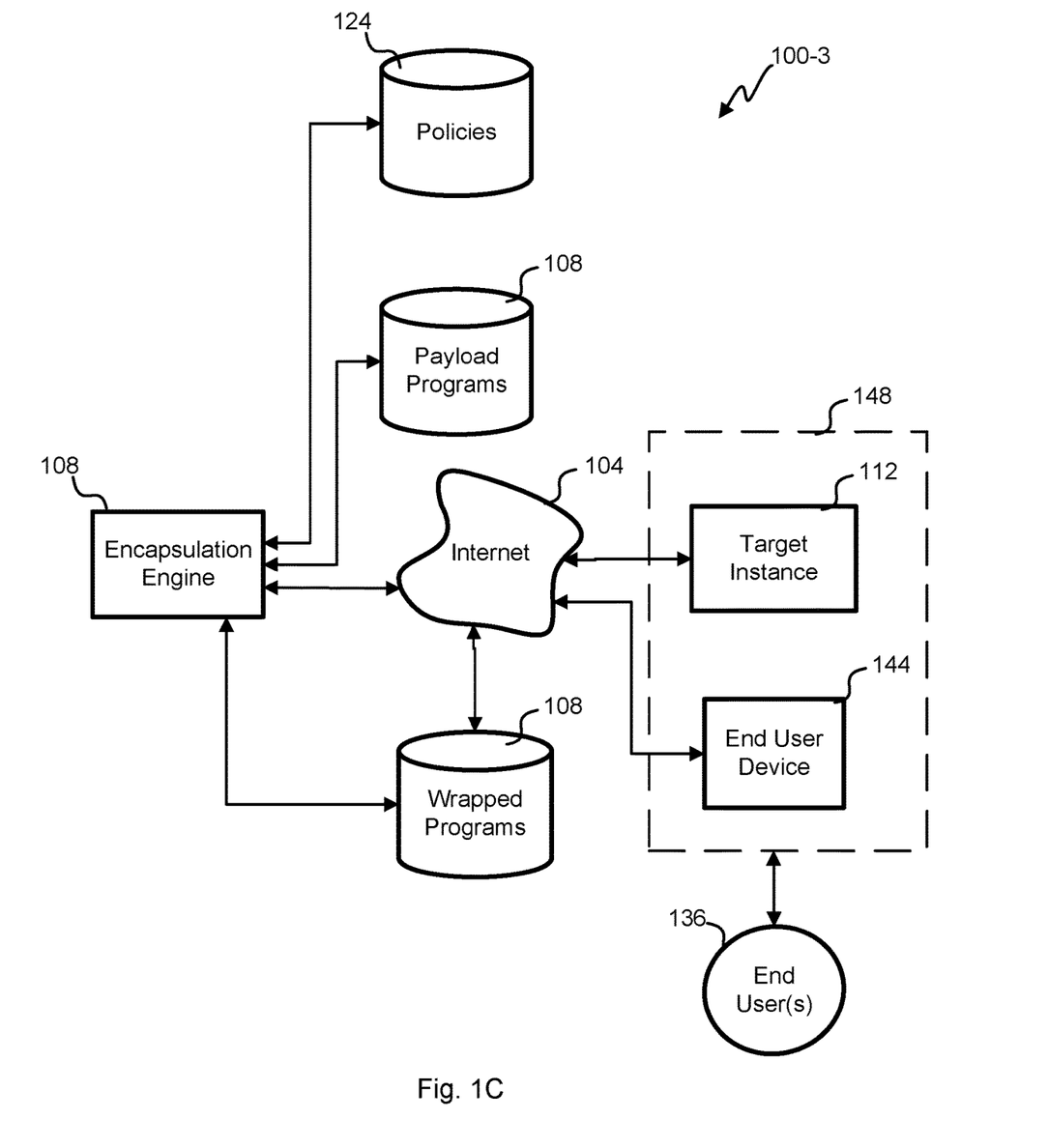

Referring next to FIG. 1C, a block diagram of yet another embodiment of the authenticated software distribution system 100-3 is shown. Unlike the embodiments of FIGS. 1A & 1B, this embodiment doesn't do management of admin credentials. The IT staff typically knows the admin credential for the end user computers 148 and would provide that to the encapsulation engine 108, which would create the wrapped program(s) 108.

Figure 2:
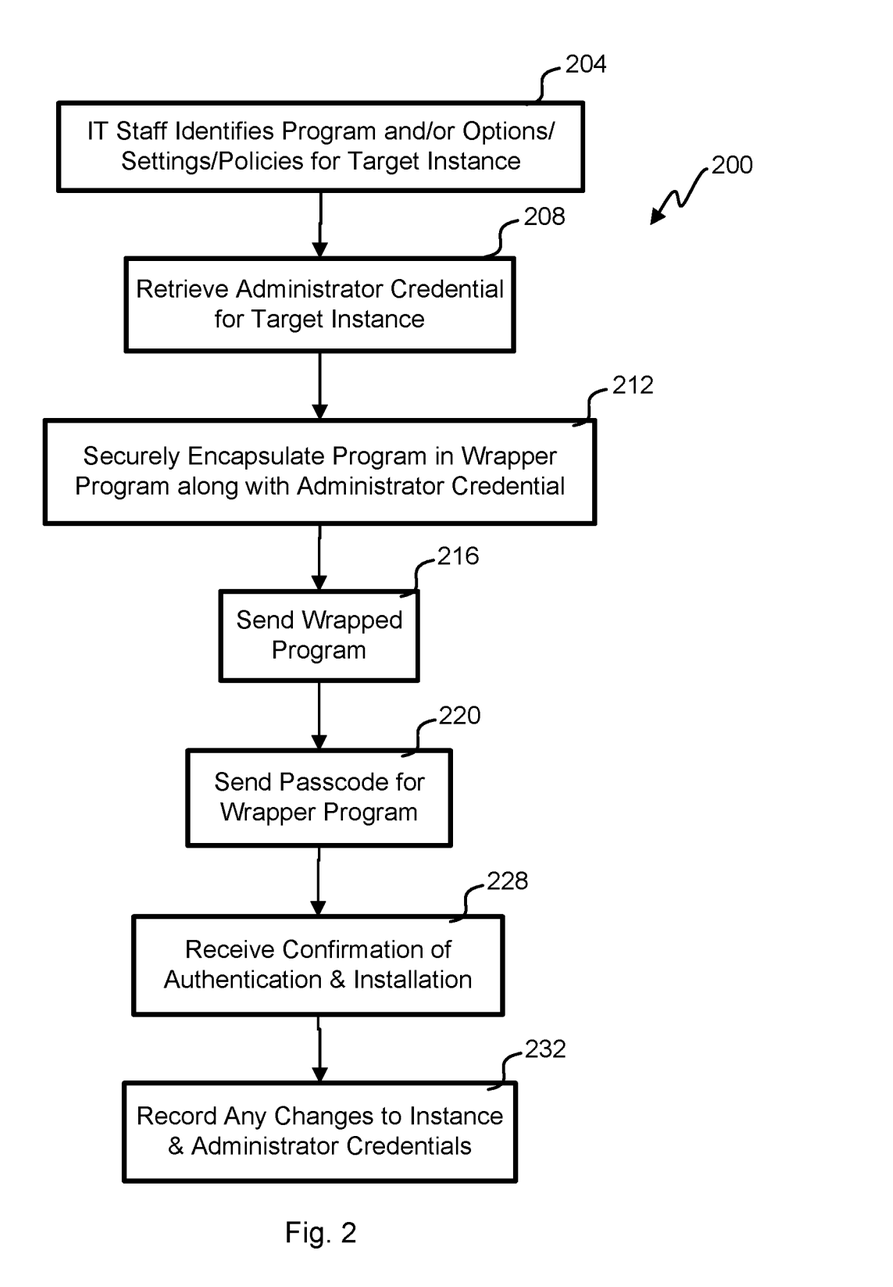
FIG. 2 illustrates a flowchart of an embodiment of a process for securely encapsulating a payload program.

With reference to FIG. 2, a flowchart of an embodiment of a distribution process 200 for securely encapsulating a payload program 110 into a wrapped program 108 is shown. The depicted portion of the distribution process 200 begins in block 204 where IT staff identifies a payload program 110 and/or policies, computer settings and/or options for the target instance 112, end user device 144, or other end user computer 148. In block 208, the admin credential is retrieved from the credential database 120 using the credential manager 116. Other embodiments may get the admin credential directly from the IT staff.

The payload program 110 is retrieved and securely encapsulated into wrapped program 108 along with the admin credential and any settings/options/policies in block 212. In some cases, there is no payload program 110 and just settings, options, and/or policies. The admin credential is also encapsulated into the wrapped program 108 in a secure way using encryption. The encryption could be a private or public keying scheme. In block 216, the wrapped program 108 is sent to a software update program on the target instance 112. Other embodiments could store the wrapped program 108 and wait for a download request from the target instance 112. Both push and pull delivery is supported.

In block 220, the passcode is retrieved from the passcode database 140 by the passcode manager 128 and sent over the cellular network 132 to the end user device 144. The target software instance 112 executes the wrapped program 108 after authentication with the passcode in block 228 before installing the payload program 110. Settings, policies and options can be included in the wrapped program 108 also.

Settings or options could be for programs, the operating system, the computer hardware, or network equipment. For example, a firmware update for a router on the network could be performed. Policies could be conditionals or checks performed by the wrapped program 108 to perhaps take different actions during the install with the admin credentials. For example, checking the firewall settings, confirming virus checking, interrogating software to confirm patches or updates have been performed, checking for key loggers or other surveillance software or devices, and other policies can be enforced by the wrapped program 108 prior to exposing the admin credential or installing the payload program 110.

After confirmation that the wrapped program performed its installation and other tasks in block 228, the changes to the software instance 112 are recorded such that the current state is known. Some wrapped programs 108 can encapsulate new admin credentials that are updated with other settings after the installation of the payload program 110. Those successful updates are recorded by the credential manager 116 for the target software instance 112 that can be used for the next wrapped program 108.

Figure 3:
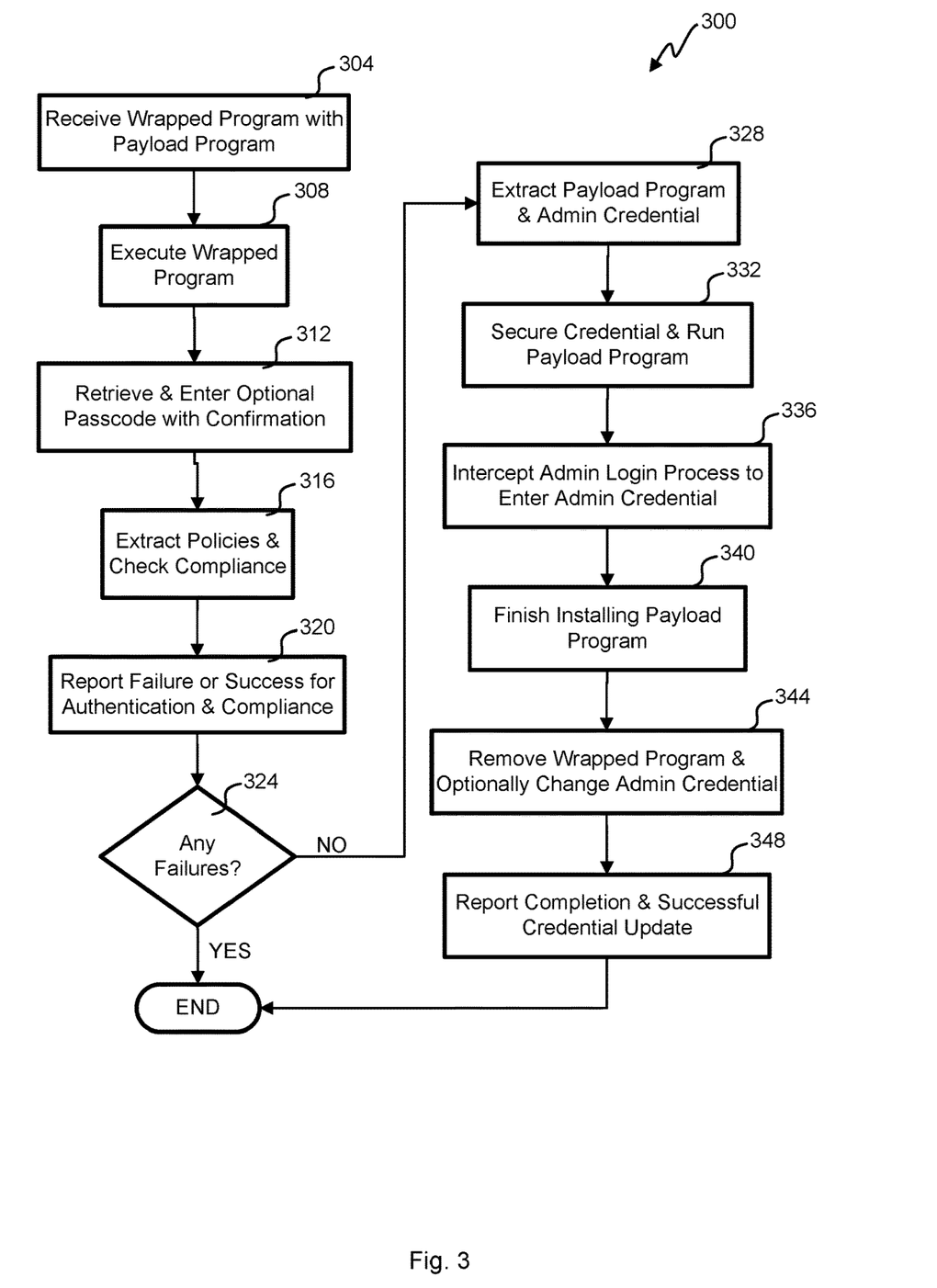
FIG. 3 illustrates a flowchart of an embodiment of a process for unwrapping the payload program.

Referring next to FIG. 3, a flowchart of an embodiment of a unwrapping process 300 for a wrapped program 108 is shown. The depicted portion of the process begins in block 304 where the wrapped program 108 is received by the end user computer 148. The end user 136 may have requested the wrapped program 108 from a link, a download or through an app store. An optional passcode can be sent and entered into the wrapped program 108 in block 312. Execution of the wrapped program 108 doesn't require admin credentials. Although this embodiment sends an application layer wrapped program 108, other embodiments could send a wrapped app through the browser for execution.

In block 316, any policies, settings or options are extracted from the wrapped program 108 and performed or checked, which may or may not require entry of the admin credential and could be entered if necessary at this point in the unwrapping process 300. Any success or failure from blocks 312 and 316 are reported back to the authenticated software distribution system 100 in block 320. Failures are determined in block 324 and where there are any, the unwrapping process ends. Where there are no failures in block 324, processing continues to block 328.

The payload program 110 and admin credential is extracted in block 328. Extraction includes decryption and/or authentication (e.g., checksum). The admin credential is secured on the end user computer 148, for example by encryption prior to storage on the storage drive or memory. They payload program 110 triggers the OS to require the admin credential to continue the process, which is intercepted prior to displaying the login window in block 336. The admin credential is retrieved and entered before destroying all trace of the admin credential so that it cannot be later hacked.

The payload program 110 continues installation in block 340. Some embodiments still have the wrapped program 108 checking for policy compliance while the payload program 110 is being installed to interrupt the process for a violation and report that back to the authenticated software distribution system 100. After successful installation, the wrapped program 108, payload program 110, setup files, stored admin credentials, or other files associated with the unwrapping process 300 are removed in block 344. Optionally, the admin credential can be changed if specified by the wrapped program 108. Completion of the unwrapping process 300 is reported back to the authenticated software distribution system 100 along with any admin credential update in block 348 before the unwrapping process 300 completes.

A number of variations and modifications of the disclosed embodiments can also be used. For example, some embodiments may not store the admin credentials at all when preparing the wrapped program. IT staff generally know the admin credential that might be broadly used in the enterprise such that any credential manager can be avoided.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An authenticated software distribution system for remote administrative operating system (OS) authorization and policy control, the authenticated software distribution system comprising a Personal Computer (PC) that stores instructions, which when executed, initiates a target instance, wherein the target instance:
   receives a program that doesn't require administrative rights by the OS to run on the Personal Computer (PC);
   runs the program on the PC, wherein the program encapsulates an administrative credential unique to the target instance;
   accepts the administrative credential with a login screen or application program interface (API);
   decrypts the administrative credential;
   automatically initiates an administratively-controlled activity on the PC;
   automatically enters the administrative credential into the OS;
   performs the administratively-controlled activity; and
   changes the administrative credential.

2. The authenticated software distribution system for remote administrative OS authorization and policy control as recited in claim 1, wherein the PC runs on an OS chosen from a group consisting of: Windows™, iOS™, Linux, Unix, Android™ MacOS™, and Chromebook™.

3. The authenticated software distribution system for remote administrative OS authorization and policy control as recited in claim 1, wherein the administratively controlled activity is changing a setting or option on the PC.

4. The authenticated software distribution system for remote administrative OS authorization and policy control as recited in claim 1, wherein the target instance checks compliance on the PC with a plurality of policies encapsulated in the program.

5. The authenticated software distribution system for remote administrative OS authorization and policy control as recited in claim 1, wherein the target instance deletes the administrative credential after the target instance authenticates the administrative credential.

6. The authenticated software distribution system for remote administrative OS authorization and policy control as recited in claim 1, wherein the target instance reports successfully performing the administratively-controlled activity away from the PC over a network.

7. The authenticated software distribution system for remote administrative OS authorization and policy control as recited in claim 1, wherein the administratively-controlled activity includes installation of a payload program.

8. A method for remote administrative operating system (OS) authorization and policy control on a personal computer (PC), the method comprising:
   receiving a program that doesn't require administrative rights by the OS to run on the PC;
   running the program on the PC, wherein the program encapsulates an administrative credential unique to a target instance;
   accepting the administrative credential with a login screen or application program interface (API);
   decrypting the administrative credential;
   automatically initiating an administratively-controlled activity on the PC;
   automatically entering the administrative credential into the OS;
   performing the administratively-controlled activity; and
   changing the administrative credential.

9. The method for remote administrative OS authorization and policy control on a PC of claim 8, wherein the PC runs on an OS chosen from a group consisting of: Windows™, iOS™, Linux, Unix, Android™, MacOS™, and Chromebook™.

10. The method for remote administrative OS authorization and policy control on a PC of claim 8, wherein the administratively controlled activity is changing a setting or option on the PC.

11. The method for remote administrative OS authorization and policy control on a PC of claim 8, further comprising checking compliance on the PC with a plurality of policies encapsulated in the program.

12. The method for remote administrative OS authorization and policy control on a PC of claim 8, further comprising deleting the administrative credential after authenticating the administrative credential.

13. The method for remote administrative OS authorization and policy control on a PC of claim 8, further comprising reporting successfully performing the administratively-controlled activity away from the PC over a network.

14. The method for remote administrative OS authorization and policy control on a PC of claim 8, wherein the administratively-controlled activity includes installation of a payload program.

15. An authenticated software distribution system for remote administrative operating system (OS) authorization and policy control, the authenticated software distribution system comprising one or more processors and one or more memories with code for running a target instance, wherein the target instance:
   receives a program that doesn't require administrative rights by the OS to run on a Personal Computer (PC);
   runs the program on the PC, wherein the program encapsulates an administrative credential unique to the target instance;
   accepts the administrative credential with a login screen or application program interface (API);
   decrypts the administrative credential;
   automatically initiates an administratively-controlled activity on the PC;
   automatically enters the administrative credential into the OS;
   performs the administratively-controlled activity; and
   changes the administrative credential.

16. The authenticated software distribution system for remote administrative OS authorization and policy control as recited in claim 15, wherein the PC runs on an OS chosen from a group consisting of: Windows™, iOS™, Linux, Unix, Android™ MacOS™, and Chromebook™.

17. The authenticated software distribution system for remote administrative OS authorization and policy control as recited in claim 15, wherein the administratively controlled activity is changing a setting or option on the PC.

18. The authenticated software distribution system for remote administrative OS authorization and policy control as recited in claim 15, wherein the target instance checks compliance on the PC with a plurality of policies encapsulated in the program.

19. The authenticated software distribution system for remote administrative OS authorization and policy control as recited in claim 15, wherein the target instance reports successfully performing the administratively-controlled activity away from the PC over a network.

20. The authenticated software distribution system for remote administrative OS authorization and policy control as recited in claim 15, wherein the administratively-controlled activity includes installation of a payload program.

\* \* \* \* \*